J. G. ERNST.
Rotary-Harrow.
No. 39,389.
Patented Aug. 4, 1863.
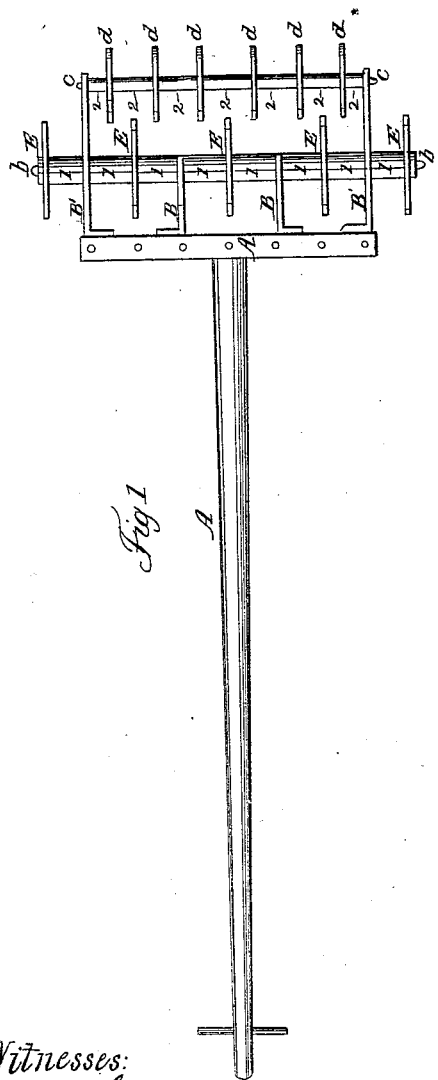
Fig. 1
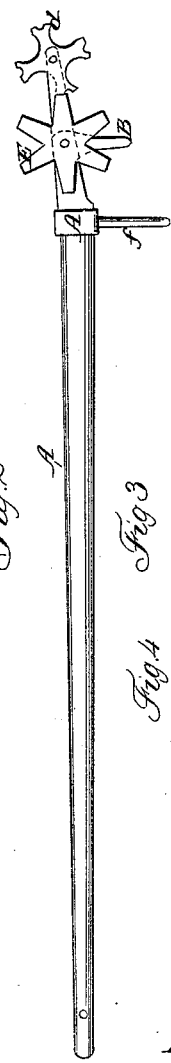
Fig. 2
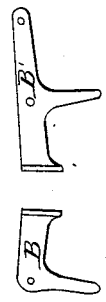
Fig. 3
Fig. 4
Witnesses:
George M. Shelter
Christian List
Inventor:
John G. Ernst

UNITED STATES PATENT OFFICE.

JOHN G. ERNST, OF YORK, PENNSYLVANIA.

IMPROVEMENT IN CLOD-CRUSHERS.

Specification forming part of Letters Patent No. 39,389, dated August 4, 1863.

*To all whom it may concern:*

Be it known that I, JOHN G. ERNST, of York, county of York, and State of Pennsylvania, have invented a new and Improved Clod-Cutter and Pulverizer; and I do hereby declare that the following is a clear, full, and exact description of the same, reference being had to the annexed drawings, making a part of this specification, in which—

Figure I is a plan; Fig. II, a side view, and Figs. III and IV side views of teeth.

Similar letters of reference indicate corresponding parts.

The object of this invention is to provide an instrument to pulverize and cultivate the earth.

To enable those skilled in the art to make and use my invention, I will proceed to describe its construction in reference to the drawings.

A A is the frame-work of an ordinary garden-rake, with teeth or pins $fffff$ attached to it.

To the cross bar or head of the rake A the teeth B B B' B' are attached by means of bolts, suitable flanges having been cast on them to provide a seat for the bolts or screw. The teeth B B have each a hole drilled into them to admit shaft $b$, and teeth B' B', which have to extend outward beyond the periphery of the wheels or cutters, have to be provided with two holes, one to correspond with the holes in the teeth B B to hold shaft $b$, and an additional hole at the extemity to admit and hold shaft C, said shaft C running parallel with shaft $b$.

On shaft $b$ and outside and between the teeth B' B' and B B are distributed the wheels or cutters E E E E E. Said wheels or cutters have proper holes drilled through their center in such manner as to admit shaft $b$ and turn freely around it. Wheels or cutters E E E E are held in their proper places by means of washers 1 1 1 1 1. They may also be held in place by means of bolts, keys, or set-screws, and thereby firmly secured to the shaft. In this case the holes through the teeth will form the bearings for the shaft, while the wheels or cutters will revolve together and in a body, being fast to the shaft.

Shaft C, which has its bearings in the teeth B' B', is mounted by an additional series of wheels or cutters, $d\,d\,d\,d\,d$, which are held in their proper places by the washers 2 2 2 2 2 and revolves around shaft $c$ freely.

This implement is adapted to perform both field and garden work, as a difference in the size only is required to fit it for either. It is, moreover, a very cheap and at the same time compact device, and performs its work in a superior manner.

Having thus fully described my invention, what I claim as new, and desire to secure by Letters Patent, is—

The combination and arrangement of the stationary teeth B' B' and B B, secured to frame-work A A, shafts $b$ and $c$, wheels and cutters E E E E, and wheels or cutters $d\,d\,d\,d\,d$, when constructed and operating as and for the purpose described.

JOHN G. ERNST.

Witnesses:
ALEX. J. FEAY,
GEORGE M. SHETTER.